Aug. 2, 1966    H. D. JOHNSON    3,263,927
METHOD FOR SPRAYING THIXOTROPIC GLASS BEAD
MIXTURES AND THE LIKE
Filed May 19, 1964    2 Sheets-Sheet 2
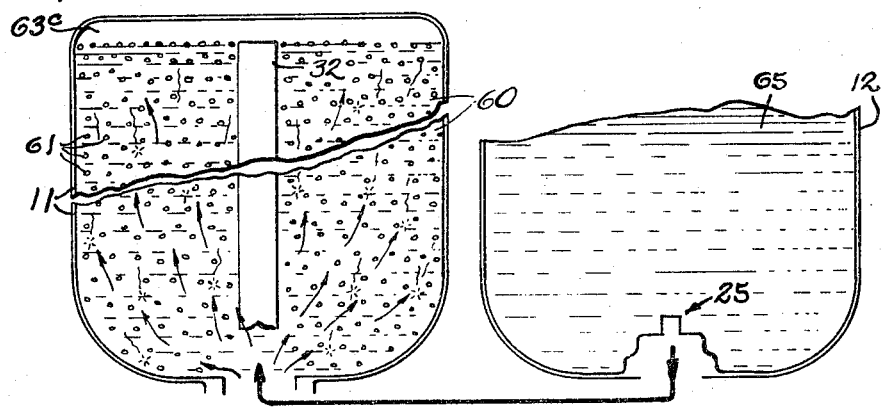
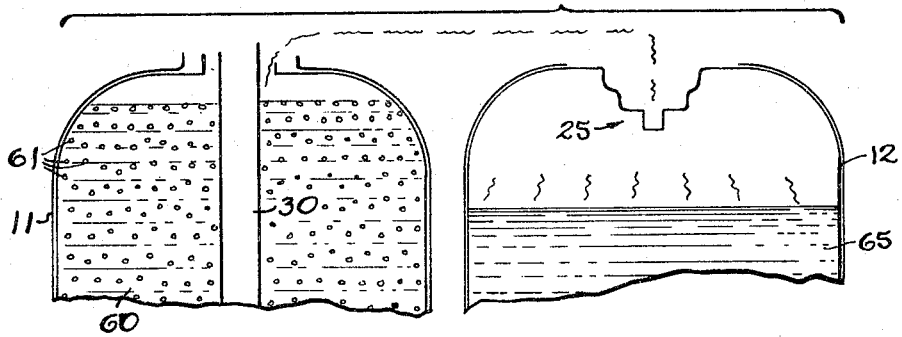
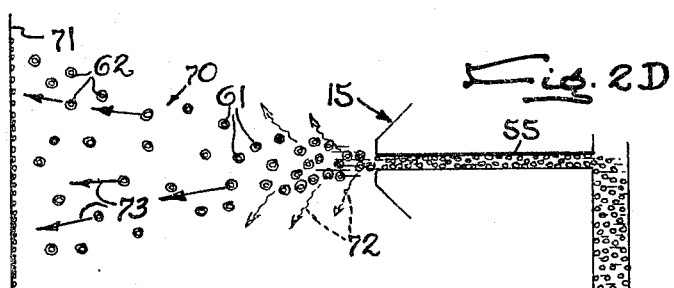
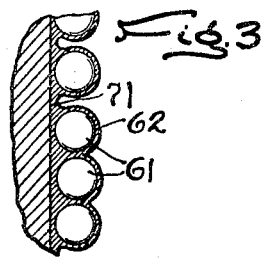
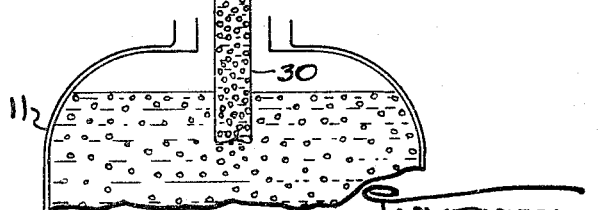
INVENTOR
Harold D. Johnson
Wolfe, Hubbard, Voit & Osann
ATTORNEY

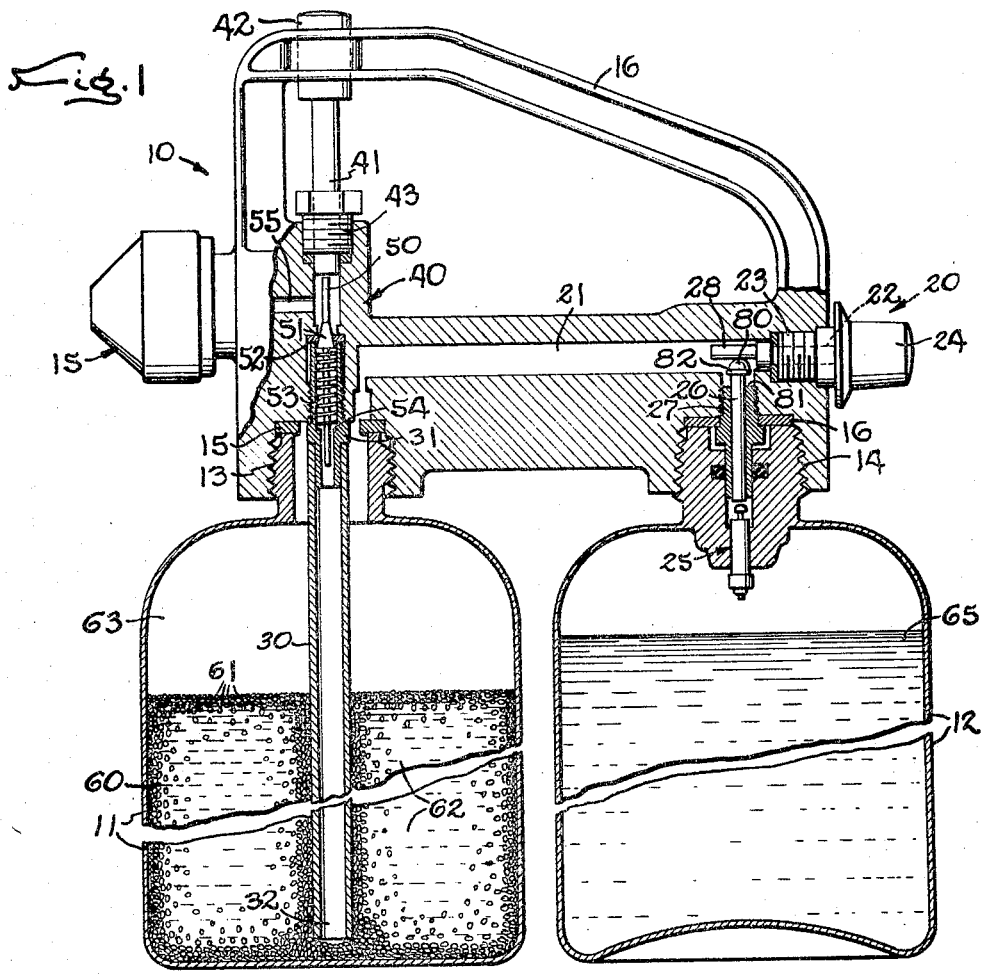
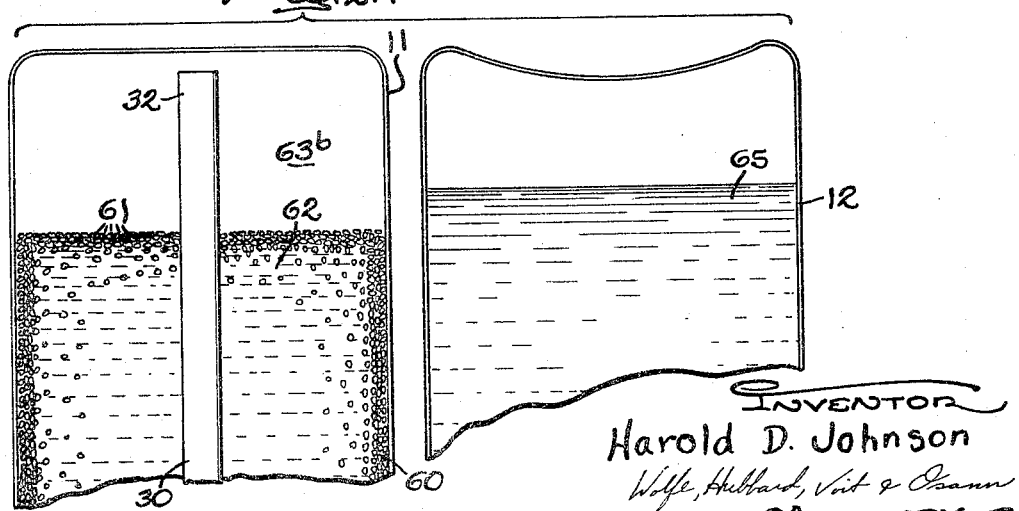

United States Patent Office 3,263,927
Patented August 2, 1966

3,263,927
METHOD FOR SPRAYING THIXOTROPIC GLASS BEAD MIXTURES AND THE LIKE
Harold D. Johnson, Emmetsburg, Iowa, assignor to Aero-Dyne Corporation, Emmetsburg, Iowa, a corporation of Iowa
Filed May 19, 1964, Ser. No. 368,467
2 Claims. (Cl. 239—1)

The present invention relates to a method and apparatus for spraying liquids containing a mass of glass beads or other material having similar properties.

Efforts have been made in the past to apply a reflective coating of glass beads upon surfaces for light reflection purposes, for example, highway signs, by spraying of a liquid mix. In a typical case the beads may have a diameter from 30 micron to 80 micron and require a binding material for holding them permanently in place on the surface. Because of the solid, weighty nature of the beads and their tendency to settle or pack, the techniques usually employed in the spraying of viscous materials have not proved successful.

It is accordingly an object of the present invention to provide a novel procedure for the spraying of normally viscous material and glass beads in an adhesive binder which makes it possible to spray, successfully, glass bead and binder mixes which are thixotropic, i.e., which become more viscous on standing, which insures free flow of the material through a relatively small nozzle employing only moderate pressures, and which causes the glass beads and binder to strike the surface to be coated fixed in final position and in a form which is sufficiently viscous to prevent runing or "curtaining" in the case of vertical surfaces.

It is another object to provide a procedure and apparatus for spraying glass bead mixtures in which all of the necessary equipment is completely portable and hand held weighing but a few pounds and which may be used remotely from a commercial power source. Consequently, it is an object to provide a procedure and apparatus which may be employed to coat highway signs, advertising signs and the like which are already installed and which is so inexpensive as to permit the procedure to be used by small business people, householders, and the like for various uses limited only by the inguenity of the owner and with only a nominal investment.

It is still another object to provide a sprayer for spraying a glass bead mix having a novel valve arrangement to improve the ease of operation and to facilitate renewing of the tanks. It is one of the more detailed objects of the invention to provide an apparatus particularly suited for the spraying of glass bead-containing mixtures but in which the control valve is so constructed and arranged so as to insure sealed re-seating at the valve surfaces notwithstanding the presence of the solid material. While the device is particularly suited for the spraying of mixtures including glass beads, it will be apparent to one skilled in the art as the discussion proceeds that the teachings are not limited to glass beads but apply to the spraying of other particulate materials having somewhat similar shape, size and density, such as beads of plastic.

Other objects and advantages of the invention will become apparent upon reading the attached detailed description and upon reference to the drawings in which:

FIGURE 1 is an elevational view in partial section showing a sprayer assembly for carrying out the present invention showing the cylinders of the sprayer as initially installed on the sprayer, the left hand tank being partially filled with a thixotropic glass bead mix and the right hand tank having a charge of liquefied gas.

FIG. 2A is a view similar to FIG. 1 but showing the tanks inverted.

FIG. 2B shows the liquefied gas injected at the bottom of the mass of glass heads.

FIG. 2C shows the righting of the tanks.

FIG. 2D shows the spraying of the thinned thixotropic mix and the depositing of the beads and binder on the receiving surface.

FIG. 3 is an enlarged cross section of the final product showing the beads held in position.

While the invention has been described in connection with a preferred method and apparatus, it will be understood that I do not intend to be limited to the particular method and apparatus set forth but intend to cover the various alternative and equivalent methods and apparatus falling within the spirit and scope of the appended claims.

Turning now to FIG. 1 there is shown a sprayer of the type which may be utilized in practicing the novel method. The sprayer having a frame or valve body 10 has secured thereto a first tank 11 for the glass bead mix and a second tank 12 for liquefied gas. The first tank is screwed into a threaded connection 13 and the second tank is screwed into a threaded connection 14 so arranged that the tanks extend downwardly, side by side. In order to prevent leakage when the tanks are screwed into place, the connections 13, 14 are provided with gaskets 15, 16 of suitable tough yet resilient plastic material. At the front of the valve body is a sprayhead or nozzle 15. The valve body is conveniently provided with a handle 16 so that it may be carried in a convenient hanging position with the nozzle 15 arranged to spray horizontally.

For the purpose of providing communication between the two tanks, a valve 20 is provided communicating with a passageway 21 which extends horizontally in the valve body. The valve 20 includes a rotatable valve stem 22 which passes through a gland 23 and with a control knob 24 at the outer end. Means are provided at the inner end of the stem for operating the discharge valve, indicated at 25, which is normally provided in commercial tanks of liquefied gas. I thus provide a plunger 26 which is guided in a tube 27 and which is engaged at its upper end by an eccentric 28 at the end of the stem. It will be apparent, then, that when the knob 24 is turned the plunger 26 will be crowded downwardly into the upper end of the stem of the valve 25 in the tank thereby releasing gas, in vapor form, from the upper end of the tank.

In carrying out the invention, means are provided for discharge of the contents of the "mix" tank 11 from the bottom of the tank. Thus, extending downwardly into the tank is a dip tube 30, the upper end of which is secured to a nipple 31, of brass or the like, which is screwed into the valve body. The lower end 32 of the dip tube extends to within a short distance of the bottom of the tank.

For controlling the discharge of the mix through the nipple 31, a discharge valve 40 is employed having a valve plunger 41 extending vertically in the valve body with a knob 42 at its upper end and having its lower end, or shank, sealed in a gland 43. Cooperating with the lower end of the plunged 41 is an elongated valve member 50 having a conical portion 51 which engages an annular valve seat 52 which is sandwiched between the upper end of the nipple 31 and the valve body. The valve member 50 is normally pressed upwardly by means of a coil spring 53 which is seated on an internal shoulder 54 formed on the inside of the nipple. The space above the valve seat is connected to the sprayhead 15 by means of a short horizontal passageway 55. It will be apparent that by depressing the knob 42 of the discharge valve, the valve member 50 will be pressed downwardly against the force of the spring 53, and initially the force of the contained pressure unseating the member at the valve seat and hence providing a channel for flow of the mix between the dip tube and the sprayhead.

In practicing the present invention the "mix" tank 11 is partly filled with a mixture 60 of glass beads 61 surrounded by a viscous binder 62 and with the mixture collecting by gravity, as shown, defining an empty space 63 at the top of the tank. The tank 12 includes a charge of liquefied gas 65. With regard to the choice of liquefied gas, it is desirable to have one capable of exerting a pressure within the range of 60 p.s.i. to 150 p.s.i. at room temperature, one which has a specific gravity on the order of 0.5 to 1.5 and which is miscible, i.e., capable of being mixed with, and capable of dissolving, the binder material 62 in the glass bead mix. The use of propane having a pressure on the order of 125 pounds p.s.i. at room temperature is preferred.

While the mix 60 in tank 11 may take various forms, I prefer to employ glass beads having a diameter lying within the range of 30 microns to 80 microns and wetted by a viscous binding material made of polyester or epoxy resin. The final mix with agitation evidences a viscosity within the range of 1,000 to 10,000 centipoises.

In accordance with the present invention, liquefied gas is injected into the partly filled tank 11 at the bottom of the mass of glass bead 60 so that it percolates through the mass separating the beads and dissolving the viscous binder to lower the overall viscosity of the mixture, with the injection being continued until the tank is substantially full, following which the contents are discharged from the bottom of the vessel through a nozzle into the atmosphere before the beads have opportunity to settle back into a more compact relation.

The mix of glass beads and binder is referred to as a "thixotropic" mix for convenience and because its characteristics have been found to be similar to more conventional thixotropic materials of the gel type. Thus in a conventional thixotropic material, the material tends to "set" or become stiff upon standing and to become flowable as a result of agitation which tends to break up the gel. The term "thixotropic" as used herein is thus intended to refer generally to a mix which tends to stiffen upon standing.

The method steps which distinguish my procedure for spraying glass bead mixes will be apparent upon reference to 2A–2D inclusive. With the valve 20 in the "off" position and with the discharge valve 40 closed, both of the cylinders are screwed into place. Under such conditions pressure is contained in the aerosol cylinder 12 and the space 63 in the "mix" cylinder remains at atmospheric pressure. The sprayer frame and connected tanks are then inverted as shown in FIG. 2A so that the materials in both the tanks, as a result of gravity, occupy a position at the "top" of the tanks. The liquefied gas is thus in contact with the valve body in readiness to move in liquid form into the passageway 21 of the valve body. The empty space in tank 11 is indicated at 63b. If desired, the steps of FIGS. 2A, 2B may be combined into one by screwing tanks into place with the frame of the sprayer in inverted position.

The valve 20 which controls release of the liquefied gas is then turned to open position depressing the plunger 26 and unseating the valve 25. Since the spray or discharge valve 40 remains closed, opening the valve 20 causes liquefied gas to pass through the passageway 21 for injection into the bottom of the mass 60 in the tank 11. The liquefied gas bubbles and percolates upwardly through the glass bead mass as shown in FIG. 2B. Simultaneously the sprayer frame and tanks are shaken to agitate the mix. Two types of agitation occur in the mass. Thus when the liquefied gas initially flows into the tank 11, which is at low initial pressure, some of the liquid flashes into bubbles of vapor which work their way upwardly through the mass. This effect is audible as indicated by an initial bubbling or gurgling sound. A certain proportion of the gas is actively absorbed by the binder which surrounds the glass beads. However, as the result of the gradual buildup of pressure which occurs in the tank 11 and as a result of the drop in temperature brought about by the initially expanding gas, the final flow of the gas into tank 11 occurs with such material in the liquid state, which liquid further percolates through, mixes with, and "dilutes" the glass bead and binder mixture. When the pressures in the two tanks are equal or the mix tank is full, the flow stops. Thus the user may be instructed to shake the unit inverted, with valve 20 open, for a certain length of time, say, 30 seconds. In a practical case a tank 11 having a nominal capacity of 28 ounces and 75% full at the start will take on aerosol liquid to the extent of 7 ounces, and the tank, after charging, will be 100% full rather than 75% reducing the free space to that shown at 63c in FIG. 2B. The effect of the addition of the liquefied gas, which is watery in consistency and of low viscosity, is to decrease the overall viscosity of the mass in the tank and to increase its fluidity. This is in addition to the separating effect upon the mass of the beads, causing the beads in the final mix to occupy a greater average spacing than the beads in the original charge. The mixing and dissolving of the aerosol liquid which occurs when the valve is open, may be augmented by shaking the assembly in the inverted position during the time that the transfer of liquefied gas in the tank is taking place. There is very little tendency for the mix to pass through the dip tube 30 at this point since the air which is trapped at the end of the tank is forced into the dip tube where it is compressed thereby opposing the entry of any substantial amount of solid material.

Following charging of the mix tank 11 with the liquefied gas the device is again righted as shown in FIG. 2C, thus breaking the fluid connection between the liquefied gas and the passageway 21, with the result that any further flow from the gas tank is in the vapor form as the "mix" tank 11 is subsequently discharged. Because of gravity the total mix in the tank 11 occupies a normal position at the bottom of the tank in communication with the lower end of the dip tube.

In the final spraying step set forth in FIG. 2D the knob 42 of the discharge valve 40 is pressed lifting the valve member 51 from its seat permitting the escape of a glass bead-binder-aerosol mixture from the passageway 54 into sprayhead 15 where it is forcibly expelled as the spray 70. When the mix strikes the atmosphere, the liquefied gas component immediately flashes to vapor form with the expansion of the gas between adjacent beads serving to positively separate the beads, one from another, as they are projected through the air toward a receiving surface 71. The gas, having completed its functions of liquefying the mix and separating the particles, escapes into the surrounding atmosphere as indicated by the arrows 72 while glass beads 61, and the binder 62, which tends to cling to the surface of the beads, continue moving, as a result of inertia, along the horizontal path indicated by the arrows 73. By limiting the time of application and by keeping the sprayer in motion a layer may be deposited which is a single bead in thickness as shown in FIG. 3 with the binder 62 causing each of the beads to adhere to the supporting surface. Because of the escape of the gaseous component, during transit from the sprayhead to the receiving surface, the binder 62 is restored to its original viscous state so that each bead remains substantially in position, held there by the binder, and entirely free of any running or "curtaining" on vertical surfaces.

The flow of the mix from the spray head is under the convenient thumb control of the operator and may be started and stopped at will under push-button control. It is one of the more detailed features of the present invention that the valve element is provided having a tapered conical valve element cooperating with a seat of soft, yet tough material, the angle of the cone being sufficiently shallow so that there is appreciable wiping action during the seat and the valve element incident to depressing and releasing the valve plunger. This wiping action, upon release of the plunger, tends to wipe the sealing surfaces free of the glass beads insuring a surface-to-surface seal between the valve elements and thus preventing leakage during the time the sprayers are shut off. The valve seat may be made of vinyl plastic or synthetic rubber or equivalent having a durometer rating of about 70. The seat resists erosion from the highly abrasive glass beads and, when worn, may be readily replaced.

I prefer to operate the sprayer so that all of the contents of the mix tank 11 is discharged within twenty four hours after charging with the aerosol liquid. I have found that the charged mix will not settle out in this period but will settle after longer delay. Thus in the case of the mix defined above, the mix may be freely discharged and completely used up in a period of one eight hour day. Following this period, which is considered conservative, it is still possible to discharge the mix successfully for a period of 16 hours, particularly with agitation, but after this the glass beads tend to settle so compactly in the tank 11 that further discharge is unreliable.

Consequently where it is necessary to start up the sprayer after an extended period, and after only a small portion of the contents of the "mix" tank 11 has been used, it is recommended that the valve 20 be shut off and that the tank 11 be slightly unscrewed to permit the escape, in vapor form, of at least some of the liquefied gas which is in the tank. This drops the temperature in the tank 11, lowering its pressure. The tank 11 is again screwed tight and the procedure set forth in FIGS. 2A–2D is repeated involving the inversion of the assembly as shown in FIG. 2A, the charging of liquefied gas as shown at 2B with percolation of additional liquid through the mass, and the righting of the tanks as shown in 2C. The mix may then be sprayed as set forth in FIG. 2D.

In accordance with one of the aspects of the present invention, means are provided for preventing escape of gas from the "mix" tank 11 when it becomes necessary to attach a new gas tank 12. More specifically, in accordance with the invention a novel check valve is embodied in the plunger 26 which controls the check valve 25 in the gas tank. Thus I provide on the plunger 26 an enlargement or head 80 which cooperates with a check valve seat 81 and with sealing being ensured by an interposed gasket 82 of soft yet tough plastic material. It will thus be apparent that with the unit completely charged as set forth in FIG. 2C and ready for use, the gas valve 20 may be restored to its off position and the gas tank 12 unscrewed. Turning the valve 20 off causes seating at the check valve 25 of the tank so that no gas escapes from the tank. As the tank is unscrewed a pressure differential is set up between the two sides of the check valve member 80, causing the same to assume a seated position against the seat 81. As the tank 12 is completely unscrewed, the full force of the pressure in the passageway 21 is available to keep the check valve 80 seated so that no gas may escape from the sprayer itself. This is an important function since, after charging, the "mix" tank 11 will normally contain several ounces of liquefied gas and loss of this much gas is not only wasteful but might allow the charged mix to escape. Moreover, maintaining pressure in the "mix" tank 11 insures against the bubbling up of the pressurized mix into the passageway 21 and into the right hand portion (FIG. 1) of the sprayer. The valve member 80, in addition to its checking function, also serves to hold the plunger 26, with which it is integral, captive in the tube 27.

While it is true that the liquefied gas, which is preferably propane, is not utilized chemically, i.e., for its heating effect only the physical properties being utilized for the spraying, nevertheless the cost for propelling a tank of glass bead mix is so low as to form only a small portion of the overall cost of application. In a practical case, one tank of gas is sufficient to discharge, with full efficiency, approximately two or three tanks of the glass bead mix.

Where the spraying is performed out of doors, the gas is released gradually and immediately dissipated by the atmosphere. Consequently, in addition to the high degree of portability and convenience, the operation is completely safe. With adequate ventilation the same procedure may, if desired, be employed indoors. Nonflammable halo-carbons (Freons) are used when flammability is a problem.

It is found that by using the above procedure glass beads may be sprayed reliably and without any tendency to clog in the nozzle. After each spraying, the unit may be held inverted while the knob 42 is pushed until the dip tube and nozzle are cleared of bead mix and clear gas is emitted. The unit may then be set aside for a period. The actual opening employed in the nozzle or sprayhead is a matter of choice of the user and depends upon the size of the beads and to some degree the concentration of the beads in the mix and the rate of required application. Since the device is so easily operated, glass bead surfaces may be used in applications where such surfacing has not been possible or economical heretofore, i.e., wherever it is desired to produce a highly reflective surface either for safety purposes or for catching the eye as in advertising or the like. The procedure and sprayer discussed above are admirably suited to repairing the reflective surfaces of highway signs and the like which have been in use for a number of years and where weathering or wear has resulted in loss of beads.

While the invention has been described in connection with the application of glass beads, it will be understood that it is not limited thereto and that other particulate materials in thixotropic mixture, tending to settle upon standing, may be efficiently sprayed or deposited. The procedure is indeed useful wherein a mix is encountered which is difficult to spray either because of the presence of solid matter or because of the viscosity of the liquid component.

The features and advantages of the device as related above refer to normal usage, but it is one of the further features of the construction that the device provides a degree of safety under conditions which might otherwise be hazardous. Thus it is possible that after charging, using the inversion procedure described above, the sprayey may be inadvertently put down in a hot place. When fully charged, the tank 11 is almost completely full as shown in FIGS. 2B, 2C. Indeed the completeness of the fill is even greater than might be expected due to the depressing effect the mix has upon the vapor pressure of the gas at a particular temperature. When the tank 11 is subsequently warmed, the increase in temperature brings about a substantial increase in the pressure within the tank 11. Where conventional valves are employed in the passage 21, for example, valves of the needle type, the material in the tank 11 has nowhere to go and, consequently, the pressure in the tank may build up to the point of a dangerous explosion.

However, in the present construction, which avoids any shutoff valve in the passageway 21, the check valve 25 in the gas tank performs a safety function. Thus, a differential pressure is achieved between the pressure in the passageway 21 and the pressure in the tank 12 sufficient to unseat the check valve 25 thereby permitting reverse flow into the tank 12 and relieving the pressure in tank 11. Since the liquefied gas which produces the excess pressure in tank 11 came from the gas tank 12 there must, necessarily, be room in the tank 12 to accommodate the excess so that any danger of explosion or the setting up of excess pressures either in the tank or in the valve body is avoided.

I claim as my invention:

1. The method of spraying a thixotropic mixture of a viscous binder having dispersed therein a mass of glass beads or the like in compact relation which comprises the steps of injecting into a closed vessel only partly filled with the mixture liquefied gas of a type which is miscible with the binder, with the liquefied gas being injected under pressure at the bottom of the settled mass so that it percolates through the mass separating the beads and mixing with the viscous binder to lower the viscosity of the mixture, continuing the injection until the vessel is substantially full, and then discharging the mixture from the bottom of the vessel through a nozzle to the atmosphere before the beads have had an opportunity to settle back into compact relation.

2. The method of spraying a thixotropic mixture of a viscous binder having dispersed therein a mass of glass beads or the like in compact relation from a vessel having a fill opening at the top and a discharge opening at the bottom which comprises the steps of inverting the vessel only partly filled with the mixture so that the mixture tends to run to the opposite end leaving an empty space above the level of the mixture, injecting under pressure at the fill opening a liquefied gas of a type which is miscible with the binder so that it percolates through the mass separating the beads and mixing with the viscous binder to lower the density of the mixture, continuing the injection until the pressure builds up in the vessel opposing further flow, righting the vessel, and then discharging the contents of the vessel from the discharge opening through a nozzle to the atmosphere before the beads have had opportunity to settle back into compact relation.

References Cited by the Examiner

UNITED STATES PATENTS

| | | | |
|---|---|---|---|
| 626,469 | 6/1899 | Taylor | 239—143 |
| 1,042,685 | 10/1912 | Kelley | 239—373 |
| 1,912,759 | 6/1933 | Clark | 239—375 |
| 2,361,144 | 10/1944 | Loepsinger | 239—8 |
| 2,419,365 | 4/1947 | Nagel | 239—8 |
| 2,591,585 | 4/1952 | Moore | 239—143 |
| 2,648,569 | 8/1953 | Vose | 239—373 |
| 2,954,935 | 10/1960 | Stearns et al. | 239—373 |

FOREIGN PATENTS

| | | |
|---|---|---|
| 860,947 | 2/1961 | Great Britain. |

M. HENSON WOOD, Jr., *Primary Examiner.*

R. S. STROBEL, *Assistant Examiner.*